(12) United States Patent
Zhu et al.

(10) Patent No.: US 12,528,674 B2
(45) Date of Patent: Jan. 20, 2026

(54) AUTOMATIC DRIVING SYSTEM OF MONORAIL HOIST DRIVEN BASED ON DIGITAL TWIN AND METHOD THEREOF

(71) Applicants: China University of Mining and Technology, Suzhou (CN); Xuzhou Liren Monorail Transportation Equipment Co., Ltd., Suzhou (CN)

(72) Inventors: Zhencai Zhu, Suzhou (CN); Hao Lu, Suzhou (CN); Yidong Zhang, Suzhou (CN); Hengzhen Hu, Suzhou (CN); Fuping Zheng, Suzhou (CN); Yu Tang, Suzhou (CN); Kang Xu, Suzhou (CN); Yuzhu Zhang, Suzhou (CN)

(73) Assignees: China University of Mining and Technology, Jiangsu (CN); Xuzhou Liren Monorail Transportation Equipment Co., Ltd., Jiangsu (CN)

( * ) Notice: Subject to any disclaimer, the term of this patent is extended or adjusted under 35 U.S.C. 154(b) by 212 days.

(21) Appl. No.: 18/429,453

(22) Filed: Feb. 1, 2024

(65) Prior Publication Data

US 2024/0166476 A1 May 23, 2024

Related U.S. Application Data

(63) Continuation-in-part of application No. 18/027,374, filed as application No. PCT/CN2022/079303 on Mar. 4, 2022, now abandoned.

(51) Int. Cl.
*G06F 17/00* (2019.01)
*B66C 13/48* (2006.01)
(Continued)

(52) U.S. Cl.
CPC .............. *B66C 13/48* (2013.01); *B66C 19/00* (2013.01); *G05B 13/0265* (2013.01); *B66C 15/00* (2013.01)

(58) Field of Classification Search
CPC ......... B66C 13/48; B66C 19/00; B66C 15/00; B66C 13/46; G05B 13/0265
(Continued)

(56) References Cited

U.S. PATENT DOCUMENTS 7,302,319 B2 * 11/2007 Wu ........................ B62D 1/265
701/19
7,317,987 B2 * 1/2008 Nahla ................... B61L 25/025
701/19

(Continued)

FOREIGN PATENT DOCUMENTS

KR          102219670 B1 *  2/2021  ......... G05B 19/0421
WO    WO-2022043214 A1 *  3/2022  ......... H04B 10/1149
WO    WO-2022073052 A1 *  4/2022  ....... G06Q 10/08355

OTHER PUBLICATIONS

Digital Twin of the Mining Shaft and Hoisting System as an Opportunity to Improve the Management Processes of Shaft Infrastructure Diagnostics and Monitoring (Year: 2021).*

*Primary Examiner* — Ronnie M Mancho
(74) *Attorney, Agent, or Firm* — JCIPRNET (57) ABSTRACT

The present disclosure belongs to the technical field of mining equipment, and in particular related to an automatic driving system of a monorail hoist driven based on a digital twin and a method thereof. The system includes a railroad switch sensor module, a positioning system module, a data transferring system, an intelligent control system, a digital twin system and an automatic driving module. The railroad switch sensor module is configured to sense the connection-position state of a movable track in a monorail hoist railroad switch track. The data transferring system is configured to (Continued)

transmit the data on the surface and underground. The method applies the digital twin technology to the automatic driving in the monorail hoist, reduces the input of personnel in the mine, and avoids safety accidents caused by irregular management or improper operation of the driver, through the deploying of the automatic driving module for the monorail hoist.

8 Claims, 2 Drawing Sheets

(51) Int. Cl.
*B66C 19/00* (2006.01)
*G05B 13/02* (2006.01)
*B66C 15/00* (2006.01)

(58) Field of Classification Search
USPC .......................................................... 701/19
See application file for complete search history.

(56) References Cited

U.S. PATENT DOCUMENTS

| | | | | |
|---|---|---|---|---|
| 8,150,568 B1* | 4/2012 | Gray | ..................... | B61L 25/025 701/19 |
| 8,180,590 B2* | 5/2012 | Szwilski | ............... | G01S 13/867 702/94 |
| 8,370,006 B2* | 2/2013 | Kumar | .................. | B61L 25/026 701/19 |
| 8,751,073 B2* | 6/2014 | Kumar | .................. | B61L 25/025 701/19 |
| 9,527,518 B2* | 12/2016 | Lacy | ..................... | B61L 15/0058 |
| 9,754,493 B2* | 9/2017 | Liao | ....................... | E02F 9/2054 |
| 9,896,115 B2* | 2/2018 | Wills | ...................... | B61L 27/12 |
| 10,262,542 B2* | 4/2019 | Brooks | ............... | B61L 15/0072 |
| 10,618,536 B2* | 4/2020 | El Fassi | ................. | B61L 3/127 |
| 10,693,557 B1* | 6/2020 | Ayotte | ................ | H04B 10/116 |
| 11,012,869 B1* | 5/2021 | Kwatra | ............. | H04B 10/1149 |
| 11,169,269 B2* | 11/2021 | Mesher | .................. | H04N 23/54 |
| 11,445,369 B2* | 9/2022 | Kwatra | .............. | H04W 12/068 |
| 11,653,292 B2* | 5/2023 | Azizi | ................ | H04W 52/0261 370/329 |
| 11,691,655 B2* | 7/2023 | Lata | ..................... | B61L 15/0081 702/34 |
| 11,736,537 B2* | 8/2023 | Hannu | .................... | H04L 67/59 709/224 |
| 2014/0081445 A1* | 3/2014 | Villamar | .............. | G06Q 10/087 701/19 |
| 2015/0272698 A1* | 10/2015 | Rolfes | .................... | A61B 5/066 600/424 |
| 2017/0232943 A1* | 8/2017 | Brooks | .................... | G08G 1/22 701/19 |
| 2019/0319705 A1* | 10/2019 | Harris | .................... | H04W 84/18 |
| 2021/0191218 A1* | 6/2021 | Trikha | .................... | H04W 88/04 |
| 2022/0180751 A1* | 6/2022 | Melchionne | ............. | G08G 1/20 |
| 2022/0217186 A1* | 7/2022 | Hannu | .................... | H04W 4/16 |

* cited by examiner

AUTOMATIC DRIVING SYSTEM OF MONORAIL HOIST DRIVEN BASED ON DIGITAL TWIN AND METHOD THEREOF

CROSS-REFERENCE TO RELATED APPLICATIONS

This application is a continuation-in-part of and claims the priority benefit of U.S. patent application Ser. No. 18/027,374, filed on Mar. 21, 2023. The prior U.S. patent application Ser. No. 18/027,374 is a 371 of International PCT application serial no. PCT/CN2022/079303, filed on Mar. 4, 2022, which claims the priority benefit of China Patent Application No. 202110981866.5, filed on Aug. 25, 2021. The entirety of each of the above-mentioned patent applications is hereby incorporated by reference herein and made a part of this specification.

BACKGROUND

Technical Field

The present disclosure belongs to the technical field of mining equipment, and in particular relates to an automatic driving system of a monorail hoist driven based on a digital twin and a method thereof.

Description of Related Art

At present, China is vigorously promoting the intelligent construction on coal mines, and the mining transportation system is gradually developing from "manned transportation" to "mechanized replacement" until "unmanned transportation". Coal transportation belongs to a high-risk industry. In the coal mine accidents, coal accidents caused by transportation are not in the minority. Traditional monorail hoists require a driver to operate in the cab, but safety accidents caused by factors such as irregular management or improper operation of the driver are prone to occur, and due to the poor roadway environment, it will also cause health problems for the drivers.

SUMMARY

The present disclosure provides an automatic system of a monorail hoist driven based on a digital twin and a method thereof, which realizes the unmanned transportation of the monorail hoist, reduces the input of personnel under the mine, and avoids safety accidents caused by irregular management or improper operation of the driver, obtains the position distribution of the monorail hoist underground, and realizes the high efficiency of the transportation deploying for the monorail hoist.

The technical solutions adopted by the present disclosure to solve the technical problems are as follows. Provided is an automatic driving system of a monorail hoist driven based on a digital twin and a method thereof. The automatic driving system comprises a data transferring system, a high-speed communication link, an automatic driving module, a railroad switch sensor module and a positioning system module located underground, and an intelligent control system and a digital twin system located on a surface.

The data transferring system includes a plurality of mining lamps, the plurality of mining lamps are arranged on an inner wall of a roadway at intervals, and the data transferring system is configured to transmit data on the surface and underground.

The high-speed communication link is configured to transmit data between the railroad switch sensor module and the data transferring system, between the positioning system module and the data transferring system, and between the data transferring system and the intelligent control system.

The automatic driving module is connected to the data transferring system, and the automatic driving module is arranged on each monorail hoist, and the automatic driving module is configured to control the monorail hoist to realize an unmanned driving.

The railroad switch sensor module includes a plurality of railroad switch sensors, the plurality of railroad switch sensors are arranged at each movable track of each railroad switch 4 one by one, and the railroad switch sensors are configured to sense a connection-position state of each movable track of each railroad switch.

The positioning system module is configured to pick up a profile of an inner surface in the roadway to position a track device and to position a geographic position of each underground monorail hoist in real time, and to transmit a picked-up position information of the profile of the inner surface in the roadway, a positioning position information of the track device and a geographic position information of each underground monorail hoist to the data transferring system.

A bidirectional transmission is performed between the intelligent control system and the data transferring system, a bidirectional transmission is performed between the data transferring system and the railroad switch sensor module, and a bidirectional transmission is performed between the data transferring system and the positioning system module. A bidirectional transmission is performed between the digital twin system and the intelligent control system.

Preferably, in the present disclosure, the intelligent control system includes a data transceiving unit, a data processing unit, and a control unit.

The data transceiving unit performs a bidirectional transmission with the railroad switch sensor module through the data transferring system, and performs a bidirectional transmission with the positioning system module through the data transferring system.

The data processing unit receives information transmitted by the data transceiving unit, and the data processing unit transmits the information to the digital twin system after optimizing the information.

The digital twin system transmits the information to the control unit, and the control unit sends an instruction to the data transceiving unit.

Preferably, in the present disclosure, the high-speed communication link is further configured to transmit the data between the data transceiving unit and the data transferring system, between the transceiving unit and the data processing unit, between the data processing unit and the digital twin system, between the digital twin system and the control unit, and between the control unit and the data transceiving unit.

Preferably, in the present disclosure, the positioning system module includes a positioning tag and a positioning base station.

The positioning tag is arranged on the inner surface of the roadway to pick up the profile of the inner surface in the roadway, and is configured to transmit the picked-up position information of the profile of the inner surface in the roadway to a nearest positioning base station.

The positioning tag is further arranged on the track device to position the track device, and is configured to transmit the positioning position information of the track device to the nearest positioning base station.

The positioning tag is further arranged on the monorail hoist to position the geographic position of each underground monorail hoist in real time, and is configured to transmit the geographic position information of each underground monorail hoist to the nearest positioning base station.

The positioning base station is arranged in the roadway at intervals, the positioning base station is connected to the positioning tag through a wireless network, the positioning base station is configured to receive the picked-up position information, the positioning position information and the geographic position information from the positioning tag, and then transmit the position information to data transceiving unit on the surface.

Preferably, in the present disclosure, the track device includes the roadway, a monorail hoist track, a chain, and an anchor bolt.

Preferably, in the present disclosure, each of the mining lamps includes a first wireless signal receiving device, a first wireless signal transmitting device, a first LIFI wireless signal receiving device, and a first LIFI wireless signal transmitting device. The data transceiving unit is respectively connected to the first wireless signal receiving device and the first wireless signal transmitting device. The first wireless signal receiving device is wiredly connected to the first LIFI wireless signal transmitting device, and the first wireless signal transmitting device is wiredly connected to the first LIFI wireless signal receiving device.

The automatic driving module includes a second LIFI wireless signal receiving device, and the second LIFI wireless signal receiving device is connected to the first LIFI wireless signal transmitting device through a LIFI wireless communication link.

The positioning base station includes a second LIFI wireless signal transmitting device, and the second LIFI wireless signal transmitting device is connected to the first LIFI wireless signal receiving device through the LIFI wireless communication link.

The railroad switch sensor module includes a third LIFI wireless signal receiving device and a third LIFI wireless signal transmitting device. The third LIFI wireless signal receiving device is connected to an output terminal of the first LIFI wireless signal transmitting device through the LIFI wireless communication link, and the third LIFI wireless signal transmitting device is connected to the first LIFI wireless signal receiving device through the LIFI wireless communication link.

Preferably, in the present disclosure, a data transmission path from the surface to the underground is that the data transceiving unit transmits the data to the first wireless signal receiving device, the first wireless signal receiving device transmits the data to the first LIFI wireless signal transmitting device, and then the first LIFI wireless transmitting device transmits the data to the second LIFI wireless signal receiving device and the third LIFI wireless signal receiving device respectively.

A data transmission path from the underground to the surface is that the second LIFI wireless signal transmitting device and the third LIFI wireless signal transmitting device respectively transmit the data to the first LIFI wireless signal receiving device, the first LIFI wireless signal receiving device transmits the data to the first wireless signal transmitting device, and the first wireless signal transmitting device transmit the data to the data transceiving unit.

Further provided is an automatic driving method of a monorail hoist driven based on a digital twin. The method includes the following steps.

In Step S1, a static digital twin model of a roadway is established.

In S1-1, a connection-position state of each movable track of each railroad switch, a cross sectional size of the roadway and a trend of the roadway are transmitted by a railroad switch sensor module and a positioning system module to an intelligent control system through a data transferring system.

In S1-2, the received information is transmitted by the intelligent control system to a digital twin system.

In S1-3, the static digital twin model of the roadway is established by the digital twin system according to the received information.

In Step S2, a static digital twin model of a monorail hoist is established.

In S2-1, geographic position information of each monorail hoist is transmitted by the positioning system module to the intelligent control system through the data transferring system.

In S1-2, the information is transmitted by the intelligent control system to the digital twin system.

In S1-3, a static digital twin model for each monorail hoist is independently established by the digital twin system according to the received information.

In Step S3, a complete static digital twin model is obtained.

In S3-1, the static digital twin model of the monorail hoist established in Step S2 is imported into the static digital twin model of the roadway established in Step S1, to integrate into the complete static digital twin model.

In Step S4, the data are imported.

In S4-1, each monorail hoist is numbered in sequence in a form of serial numbers.

In S4-2, the numbered information in Step S4-1 is imported into an automatic driving module of the monorail hoist and the static digital twin model corresponding to each monorail hoist.

In Step S5, a dynamic digital twin model is obtained.

In S5-1, a dynamic position of an entire body of each monorail hoist is captured by the positioning system module in real time, and the dynamic position of the entire body of each monorail hoist is transmitted to the intelligent control system.

In S5-2, the obtained dynamic position information on the entire body of each monorail hoist is transmitted by the intelligent control system in real time to the complete static digital twin model obtained in Step S3, to update a position of the digital twin of each monorail hoist in the static digital twin model of the roadway in real time.

In S5-3, a process from static digital twins to dynamic digital twins is completed at this point, and the dynamic position information on the entire body of the monorail hoist corresponding to each number in the roadway is obtained, to obtain the dynamic digital twin model of each monorail hoist in the roadway.

In Step S6, an unmanned deploying control is performed on the monorail hoist.

In S6-1, the digital twin system is connected to a control unit of the intelligent control system.

In S6-2, the data for the dynamic digital twin in Step S5 is read by the control unit in real time, and the read data are analyzed.

In S6-3, according to the analysis in Step S6-2, a corresponding instruction is made by the control unit, and the corresponding instruction is transmitted to the data transceiving unit, and the instruction is transmitted by the data transceiving unit to the automatic driving module through the data transferring system.

In S6-4, the unmanned deploying control is performed by the automatic driving module on the corresponding monorail hoist.

Preferably, in the present disclosure, the method further includes Step 7 implemented before Step 3, and Step 7 is specifically as follows.

In Step 7, a static digital twin model of the track device is established.

In S7-1, geographical positions of the roadway, a monorail hoist track, a chain and an anchor bolt are positioned by a plurality of positioning tags in the positioning system module.

In S7-2, the geographic position information on the track device obtained in Step S7-1 is transmitted to the intelligent control system through the data transferring system.

In S7-3, the received information is transmitted by the intelligent control system to the digital twin system.

In S7-4, the static digital twin model of the track device is established by the digital twin system according to the received information.

Through the above technical solutions, the beneficial effects of the present disclosure lie in the following in comparison with the prior art.

1. In the present disclosure, each monorail hoist is numbered, and the state of each numbered monorail hoist is determined through a state detecting module in the automatic driving module, to be a busy condition/an idle condition.

2. The intelligent control system provided in the present disclosure skips the monorail hoist in the busy state when searching for the monorail hoist in the dynamic digital twin model.

3. The present disclosure adopts an ultra wide band positioning technology, the ultra wide band signal has a strong penetrating performance, which can solve the blocking problem of obstacles in the positioning process wonderfully, and can further realize the precise positioning of the monorail hoist, and obtain the positions where the mechanical equipment and personnel are required to transfer by the monorail hoist, deploy the nearest monorail hoist in nonworking state, and realize the high efficiency of transportation deploying for the monorail hoist.

4. The present disclosure applies the digital twin technology to the automatic driving of the monorail hoist, which realizes the unmanned transportation of the monorail hoist, reduces the input of personnel in the mine, and avoids safety accidents caused by irregular management or improper operation of the driver.

5. The positioning device can be arranged on the operator through reproducing the three-dimensional model for the underground roadway in the present disclosure. When emergency accidents of the mine collapse and the trapped personnel occur due to special reasons, the three-dimensional digital twin constructed by the digital twin can quickly search and rescue the personnel to ensure the personnel safety.

6. The mining lamps adopted in the present disclosure are used for illumination, and the data transferring system is used as an intermediary for data transmission between the surface and the underground.

BRIEF DESCRIPTION OF THE DRAWINGS

The present disclosure is further described below in combination with the accompanying drawings and the embodiments.

In the drawings: 1. Roadway; 2. Monorail hoist; 201. Automatic driving module; 2011. State detecting module; 2012. Control Module; 3. Mining lamp; 4. Railroad switch; 5. Positioning base station; 6. Positioning tag; 7. Hoisting chain; 701. Stress sensor; 8. Anchor bolt; 10. Automatic driving system.

DESCRIPTION OF THE EMBODIMENTS

The present disclosure will now be further described in detail with reference to the accompanying drawings. These drawings are all simplified schematic diagrams, which only illustrate the basic structure of the present disclosure in a schematic mode, so they only show the composition related to the present disclosure.

In the description of the present disclosure, it should be understood that the orientation or positional relationships indicated by the terms "left", "right", "upper", "lower", and the like, are those based on the orientation or positional relationships illustrated in the accompanying drawings, and only for the convenience of describing the present disclosure and simplifying the description, rather than indicating or implying that the referred devices or elements must have a particular orientation, and be constructed and operated in a particular orientation. The "first", "second" and the like, do not indicate the importance of the components, and therefore cannot be construed as the limitations to the present disclosure. The specific dimensions used in these embodiments are only for illustrating the technical solutions, and do not limit the protection scope of the present disclosure.

Embodiment 1

Figure 1:
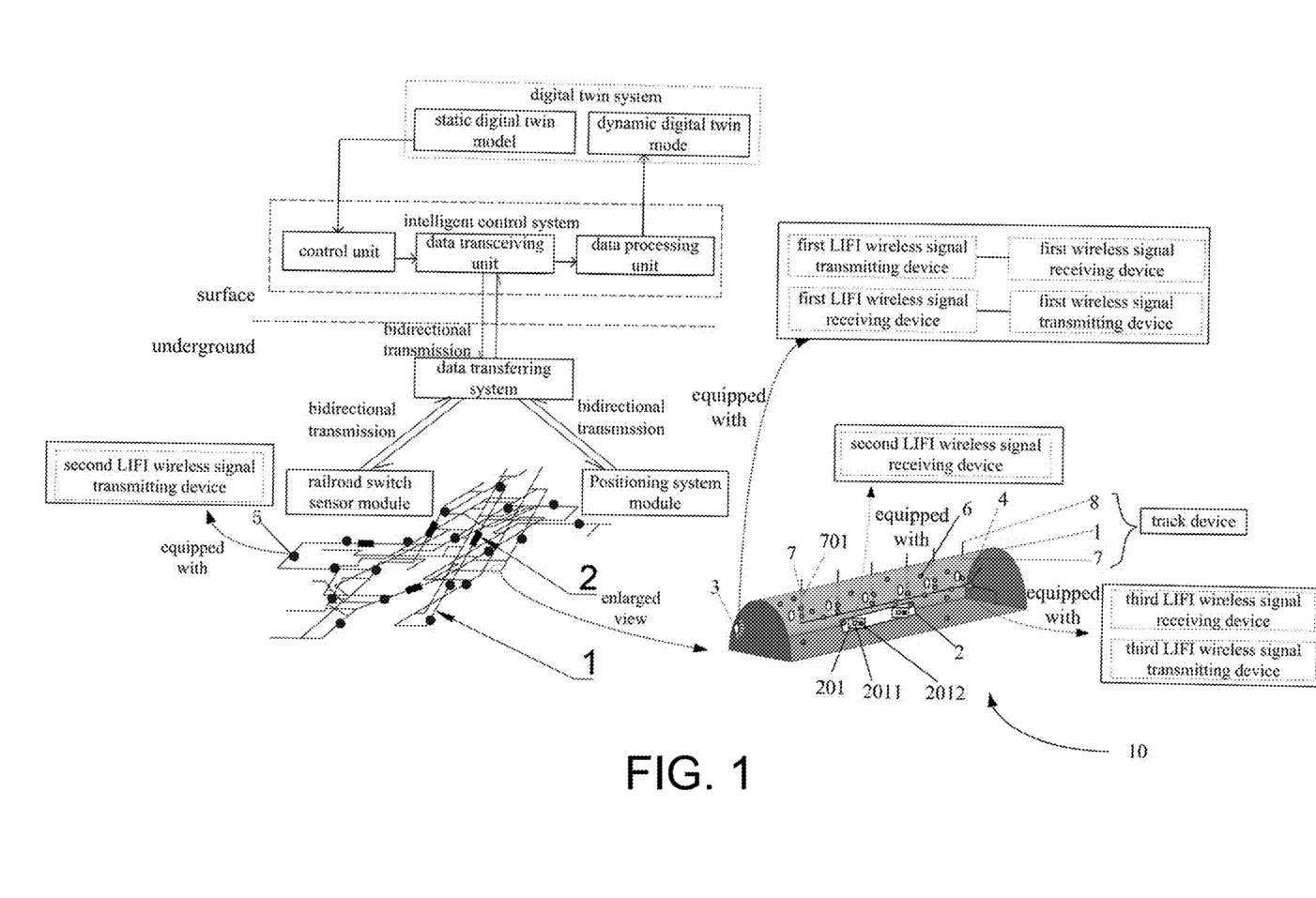
FIG. 1 illustrates a structural schematic diagram of an automatic driving system in the present disclosure.

Provided in this embodiment is a preferred implementation, which is an automatic driving system 10 of a monorail hoist driven based on a digital twin. As illustrated in FIG. 1, the above-mentioned automatic driving system 10 includes a data transferring system, a high-speed communication link, an automatic driving module 201, and a railroad switch sensor module and a positioning system module located underground, and an intelligent control system and a digital twin system located on a surface.

A bidirectional transmission is performed between the intelligent control system and the data transferring system, a bidirectional transmission is performed between the intelligent control system and the digital twin system, a bidirectional transmission is performed between the data transferring system and the railroad switch sensor module, and a bidirectional transmission is performed between the data transferring system and the positioning system module.

The intelligent control system includes a data transceiving unit, a data processing unit, and a control unit. The data transceiving unit performs a bidirectional transmission with the railroad switch sensor module through the data transferring system. The data transceiving unit performs a bidirectional transmission with the positioning system module through the data transferring system. The data processing unit receives the information transmitted by the data transceiving unit, and the data processing unit transmits the information to the digital twin system after optimizing the information. The digital twin system transmits the information to the control unit, and the control unit sends an instruction to the data transceiving unit.

The digital twin system includes a three-dimensional modeling software, and the three-dimensional modeling software is configured to establish the digital twin. The digital twin system is configured to reflect a real-time position of each underground monorail hoist 2 and a visual information of a connection-position state of each movable track of each underground railroad switch. A changing track of the movable track is controlled by the movable track controller, and the movable track controller is connected to the data transceiving unit.

The railroad switch sensor module includes a plurality of railroad switch sensors, the plurality of railroad switch sensors are arranged at each movable track of each railroad switch one by one. The railroad switch sensors are configured to sense an connection-position state of each movable track of each railroad switch, and transmit the sensed information to the data transceiving unit in the intelligent control system through the data transferring system.

An ultra wide band positioning technology is adopted in the positioning system module. The positioning system module includes a plurality of positioning tags and a plurality of positioning base stations 5. The plurality of positioning tags are arranged on the monorail hoist 2, the inner surface of the roadway 1, and the track device. The track device includes the roadway 1, the monorail hoist track (including the railroad switch), the chain, and the anchor bolt 8, that is, the roadway 1, the monorail hoist track (including the railroad switch), the chain, and the anchor bolts 8 are all provided with positioning tags. The information on the geographic position of the monorail hoist 2, the size of the cross sectional on the inner surface of the roadway 1, and the geographic positions of the roadway 1, the monorail hoist track (including railroad switch), the chain and the anchor bolt 8 in the track device is sensed by the plurality of positioning tags, and the sensed information is transmitted to the data transceiving unit in the intelligent control system. The positioning tags on the inner surface of the roadway 1 are arranged in a certain rule (arrangement rule: the arrangement effect can maximally reflect the profile of the roadway 1). The positioning tags are configured to pick up the spotted profiles of the roadway. A fitting algorithm is applied to the computer to fit the discretized spotted profiles to a continuous curved-surface profile, that is, a three-dimensional model of the roadway 1 is obtained, the three-dimensional model includes the cross sectional size and the trend of the roadway 1. A positioning base station is mounted every 150-200 meters inside the roadway 1, and the positioning tag is connected with the positioning base station 5 through a wireless network. The positioning base station 5 receives the position information of the positioning tag, and then transmits the position information to the data transceiving unit on the surface. Further, a plurality of positioning tags arranged at the front and rear ends of each monorail hoist 2 are configured to position the geographic position of the entire body of each monorail hoist 2 in real time, and transmit to the nearest positioning base through the wireless network, and transmit the information to the data transceiving unit in the intelligent control unit through the data transferring system.

The high-speed communication link is configured to transmit the data between the railroad switch sensor module and the data transferring system, between the positioning system module and the data transferring system, between the data transceiving unit and the data transferring system, between the data transceiving unit and the data processing unit, between the data processing unit and the digital twin system, between the digital twin system and the control unit and between the control unit and the data transceiving unit.

The automatic driving module 201 is connected to the data transceiving unit in the intelligent control system through the data transferring system. The automatic driving module 201 arranged at the front and rear ends of each monorail hoist 2 is configured to control the monorail hoist 2 to realize the unmanned driving.

Figure 2:
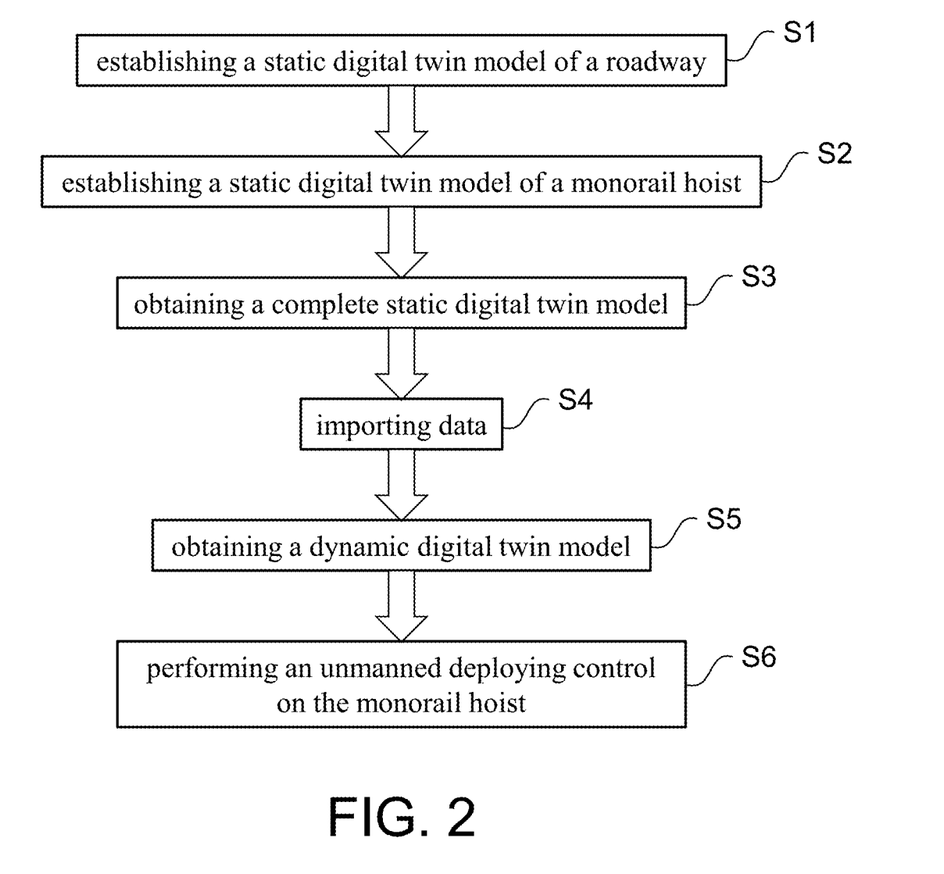
FIG. 2 illustrates a flow chart of an automatic driving method in the present disclosure.

This embodiment further provides an automatic driving method of a monorail hoist driven based on a digital twin. As illustrated in FIG. 2, the automatic driving method includes the following steps.

In Step S1, a static digital twin model of a roadway is established.

In S1-1, the railroad switch sensor in the railroad switch sensor module transmits a connection-position state of each movable track in each railroad switch 4, and the plurality of positioning tags transmits the picked-up roadway spotted profiles to an intelligent control system through a data transferring system.

In S1-2, the received information is transmitted by the intelligent control system to a digital twin system.

In S1-3, the static digital twin model of the roadway is established by the digital twin system according to the received information, and the static digital twin model of the roadway includes the cross sectional size and trend of the roadway 1.

In Step S2, a static digital twin model of a monorail hoist is established.

In S2-1, geographic position information of each monorail hoist 2 is transmitted by the positioning system module to the intelligent control system through the data transferring system.

In S1-2, the information is transmitted by the intelligent control system to the digital twin system.

In S1-3, a static digital twin model for each monorail hoist 2 is independently established by the digital twin system according to the received information.

In Step S3, a complete static digital twin model is obtained.

In S3-1, the static digital twin model of the monorail hoist established in Step S2 is imported into the static digital twin model of the roadway established in Step S1, to integrate into the complete static digital twin model.

In Step S4, the data are imported.

In S4-1, each monorail hoist 2 is numbered in sequence in a form of 001, 002, 003 . . . .

In S4-2, the numbered information in Step S4-1 is imported into an automatic driving module 201 in the monorail hoist 2 and the digital twin model corresponding to each monorail hoist 2.

In Step S5, a dynamic digital twin model is obtained.

In S5-1, a dynamic position of an entire body of each monorail hoist 2 is captured by the positioning system module in real time, and the dynamic position of the entire body of each monorail hoist is transmitted to the intelligent control system.

In S5-2, the obtained dynamic position information on the entire body of each monorail hoist 2 is transmitted by the intelligent control system in real time to the complete static digital twin model obtained in Step S3, to update a position of the digital twin of each monorail hoist 2 in the static digital twin model of the roadway in real time.

In S5-3, a process from static digital twins to dynamic digital twins is completed at this point, and the dynamic position information on the entire body of the monorail hoist 2 corresponding to each number in the roadway is obtained, to obtain the dynamic digital twin model of each monorail hoist 2 in the roadway.

In Step S6, an unmanned deploying control is performed on the monorail hoist 2.

In S6-1, the digital twin system is connected to a control unit of the intelligent control system.

In S6-2, the data for the dynamic digital twin in Step S5 is read by the control unit in real time, and the read data are analyzed.

In S6-3, according to the analysis in Step S6-2, a corresponding instruction is made by the control unit, and the corresponding instruction is transmitted to the data transceiving unit, and the instruction is transmitted by the data transceiving unit to the automatic driving module 201 through the data transferring system.

In S6-4, the unmanned deploying control is performed by the automatic driving module 201 on the corresponding monorail hoist 2.

Further, the automatic driving module 201 includes a state detecting module 2011 and a control module 2012 of the monorail hoist 2.

The state detecting module 2011 is configured to determine two working states of the monorail hoist 2, one of which is a busy state and the other is an idle state. Further, a stress sensor 701 is arranged on the hoisting chain 7 of the monorail hoist 2. When the stress value measured by the stress sensor 701 on the hoisting chain 7 exceeds the preset range, the automatic driving module 201 determines that the monorail hoist 2 is in a busy state. The automatic driving module 201 transmits the state signal of the monorail hoist 2 to the intelligent control system on the surface, and then the intelligent control system transmits the state signal of the monorail hoist 2 to the digital twin system, and the monorail hoist 2 corresponding to the dynamic digital module in the digital twin system is marked as the busy state. When the stress value measured by the stress sensor 701 does not exceed the preset range, the automatic driving module 201 determines that the monorail hoist 2 is in an idle state, the automatic driving module 201 transmits the state signal of the monorail hoist to the intelligent control system on the surface, and the intelligent control system transmits the state signal to the digital twin system, and the monorail hoist 2 corresponding to the dynamic digital twin model in the digital twin system is marked as the idle state.

The control module 2012 of the monorail hoist 2 is arranged on the monorail hoist 2, and the control module 2012 of the monorail hoist 2 receives the control instruction sent by the data transceiving unit, and performs automatically driving on the monorail hoist 2 according to the instruction.

The specific deploying methods related to the automatic driving method are as follows.

The intelligent control system reads the three-dimensional cross section and trend of the underground roadway 1, reads the position where each monorail hoist 2 is located and its corresponding number, and reads the geographic position where the railroad switch 4 is located and the connection-position state of the movable track in railroad switch 4.

When the monorail hoist 2 is required to transport after other monorail hoist 2 has transported the mechanical equipment or personnel to the transporting point of the designated monorail hoist 2, the intelligent control system immediately determines the positions of the transferring point and the target point to be transported, after the transferring point and the target point are determined, an artificial intelligence algorithm is built in the intelligent control system, the intelligent control system searches for the monorail hoist 2 nearest to the transporting point and in an idle state in the established dynamic digital twin model by using the artificial intelligence algorithm.

When planning the path between the transporting point and the target point, a required path with a shorter and a slower slop of the roadway 1 is searched as the optimal walking path. Further, when the intelligent control system searches the monorail hoist 2 that is closest to the transporting point and in an idle state through the artificial intelligence algorithms, the monorail hoist 2 that is marked as busy will be ignored, and only the monorail hoist 2 that is marked as idle will be searched.

After the walking path is determined, the intelligent control system firstly marks the positions of the transporting point and the target point as well as the optimal walking path in the dynamic digital twin model, and after the monorail hoist 2 that is closest to transporting point and in an idle state is determined, the intelligent control system sends an instruction to the automatic driving module 201 on the monorail hoist 2 through the high-speed communication link. The automatic driving module 201 controls the monorail hoist 2 to go to the transferring point to complete the loading of mechanical equipment or personnel. After the transferring process is completed, the automatic driving module 201 drives the monorail hoist 2 to reach the target point along the optimal walking path. This implementation analyzes the digitized three-dimensional information, and controls the operation of the monorail hoist 2 through the automatic driving module 201 on the monorail hoist 2, and realizes the efficient and orderly deploying of each underground monorail hoist 2 controlled by the surface.

Further, the automatic driving method related to the railroad switch control, the railroad switch control refers to that when the intelligent control system sends an instruction to the automatic driving module 201 and the automatic driving module 201 controls the monorail hoist 2 to drive toward the target point, it will inevitably encounter the railroad switch, at this time, the intelligent control system is required to read the data in the dynamic digital twin model. When the intelligent control system calculate that the distance from the monorail hoist 2 in the dynamic digital twin model to the front railroad switch 4 is within the preset range through the artificial intelligence algorithms, the intelligent control system firstly read the position information on the railroad switch 4 at the moment in the dynamic digital twin model, in the case where the movable track in the railroad switch 4 is in the correct position at this moment, the intelligent control system does not make any reaction; in the case where the movable track in the railroad switch 4 is not in the correct position at this moment, the intelligent control system sends an instruction to the movable track controller at the underground railroad switch 4, and the movable track controller controls the movable track to rotate to the correct position, so that the monorail hoist 2 passes smoothly.

Further, the data transferring system includes a plurality of mining lamps 3, the plurality of mining lamps 3 are arranged on the inner wall of the roadway 1 at intervals. Provided is a first wireless signal receiving device, a first wireless signal transmitting device, a first LIFI wireless signal receiving device, and the first LIFI wireless signal transmitting device. The data transceiving unit is respectively connected to the first wireless signal receiving device and the first wireless signal transmitting device. The first wireless signal receiving device is wiredly connected to the first LIFI wireless signal transmitting device, and the first wireless signal transmitting device is wiredly connected to the first LIFI wireless signal receiving device.

The automatic driving module 201 includes a second LIFI wireless signal receiving device, and the second LIFT wireless signal receiving device is connected to the first LIFI wireless signal transmitting device through a LIFI wireless communication link.

The positioning base station 5 includes a second LIFI wireless signal transmitting device, and the second LIFI wireless signal transmitting device is connected to the first LIFI wireless signal receiving device through the LIFI wireless communication link.

The railroad switch sensor module includes a third LIFI wireless signal receiving device and a third LIFI wireless signal transmitting device, the third LIFI wireless signal receiving device is connected to an output terminal of the first LIFI wireless signal transmitting device through the LIFI wireless communication link. The third LIFI wireless signal transmitting device is connected to the first LIFI wireless signal receiving device through the LIFI wireless communication link.

A data transmission path from surface to underground is that: the data transceiving unit transmits the data to the first wireless signal receiving device, the first wireless signal receiving device transmits the data to the first LIFI wireless signal transmitting device, and then the first LIFI wireless transmitting device transmits the data to the second LIFI wireless signal receiving device and the third LIFI wireless signal receiving device respectively.

A data transmission path from underground to surface is that: the second LIFI wireless signal transmitting device and the third LIFI wireless signal transmitting device respectively transmit the data to the first LIFI wireless signal receiving device, the first LIFI wireless signal receiving device transmits the data to the first wireless signal transmitting device, and the first wireless signal transmitting device transmits the data to the data transceiving unit.

The process of transferring the control information (configured to control the unmanned automatic driving of the monorail hoist 2) from surface to underground is as follows: data transceiving unit→(through the high-speed communication link) first wireless signal receiving module→(through the wired circuit) first LIFI wireless signal transmitting device→(through the LIFI wireless communication link) the second LIFI wireless signal receiving device (the automatic driving module) and the third LIFI wireless signal receiving device (control the railroad switch).

The process of transferring the railroad switch information and position information (configured to update the digital twin) from underground to surface is as follows: the second LIFI wireless signal transmitting device (the position information) and the third LIFI wireless signal transmitting device (the railroad switch information)→(through the LIFI wireless communication link) the first LIFI wireless signal receiving device→(through the wired circuit) the first wireless signal transmitting module→(through the high-speed communication link) the data transceiving unit. As for the role, they are all intermediaries for the data transmission.

Further, the positioning system module transmits the position information on the plurality of positioning tags to the nearest positioning base station 5, the positioning base station transmits the position information to the data transferring system by the second LIFI wireless signal transmitting device through the LIFI wireless communication link, so as to determine the profile of the inner surface in the roadway 1, and the underground position information on the monorail hoist 2 and the track device. The third LIFI wireless signal transmitting device is built in the railroad switch sensor module, the railroad switch sensor module transmits the railroad switch information to the data transferring system by the third LIFI wireless signal transmitting device through the LIFI wireless communication link, and the information is transmitted by the first LIFI wireless signal transmitting device to the digital transceiving unit, and then the information is transmitted to the dynamic digital twin model in the digital twin system after optimally processing by the data processing unit. The digital twin system updates the dynamic digital twin model in real-time according to the information collected by each railroad switch sensor in the railroad sensor module and the position information (including monorail hoist 2, roadway 1 and track device) collected by the positioning tags, and converts the real three-dimensional information on the underground mine road and the monorail hoist operation condition into the digital three-dimensional information in the virtual world, thereby completing the data transmission process.

Further, the railroad switch sensor, the railroad switch controller, the third LIFI wireless signal receiving device and the third LIFI wireless signal transmitting device are arranged on the railroad switch 4.

The railroad switch controller is mounted at each movable track in each roadway 1 to control the rotation of the movable track on the railroad switch 4, and the railroad switch sensor transmits the connection-position state information of the movable track in the railroad switch 4 to the third LIFI wireless signal transmitting device, and then the third LIFI wireless signal transmitting device transmits the connection-position state information of the movable track in the railroad switch 4 to the first LIFI wireless signal receiving device inside the mining lamp 3, and the first LIFI wireless signal receiving device transmits the information to the data processing unit, and then the information is transmitted to the dynamic digital twin model in the digital twin system through the data processing unit. When the intelligent control system on the surface determines that the movable track in a certain railroad switch 4 needs to be rotated, the control unit sends a control signal and transmits the control signal to the data transceiving unit, and then the data transceiving unit transmits the control instruction to the mining lamp, the first LIFI wireless signal transmitting device in the mining lamp 3 transmits the control signal to the third LIFI wireless signal receiving device on the railroad switch 4, and the third LIFI wireless signal receiving device transmits the control signal to the railroad switch controller, and the railroad switch controller controls the railroad switch 4 to rotate to the correct position to ensure that the monorail hoist 2 passes smoothly. When the controlling of automatic driving of the monorail hoist 2 is required, the data transceiving unit in the intelligent control system transmits the control signal to the first LIFI wireless signal transmitting device inside the mining lamp 3, the first LIFI wireless signal transmitting device inside the mining lamp 3 transmits the control information to the second LIFI wireless signal receiving device in the automatic driving module 201 through the LIFI wireless communication link, so that the monorail hoist 2 is controlled by the automatic driving module 201 for the unmanned deploying.

This embodiment further includes Step 7 implemented before Step 3, and Step 7 is specifically as follows.

In Step 7, a static digital twin model of the track device is established.

In S7-1, geographical positions of the roadway 1, a track of the monorail hoist (including railroad switch), a chain and an anchor bolt 8 are positioned by a plurality of positioning tags in the positioning system module.

In S7-2, the geographic position information of the track device obtained in Step S7-1 is transmitted to the intelligent control system through the data transferring system.

In S7-3, the received information is transmitted by the intelligent control system to the digital twin system.

In S7-4, a static digital twin model of the track device is established by the digital twin system according to the received information.

The static digital twin model of the track device established in Step S7 and the static digital twin model of the monorail hoist established in Step S2 are imported into the static digital twin model of the roadway established in Step S1, to integrate into the complete static digital twin model, which can imitates the underground environment more clearly and detailedly, and is convenient to visually observe the driving condition of the monorail hoist 2.

This embodiment numbers all monorail hoists 2, and determines the state of each numbered monorail hoist to be a busy state/an idle state, through a state detecting module 2011 in the automatic driving module 201.

The intelligent control system provided in this embodiment skips the monorail hoist in the busy state when searching for the monorail hoist 2 in the dynamic digital twin model.

The present disclosure adopts an ultra wide band positioning technology, the ultra wide band signal has a strong penetrating performance, which can solve the blocking problem of obstacles in the positioning process wonderfully, and can further realize the precise positioning of the monorail hoist 2, and obtain the positions where the mechanical equipment and personnel are required to transfer by the monorail hoist, deploy the nearest monorail hoist in non-working state, and realize the high efficiency of transportation deploying for the monorail hoist.

This embodiment applies the digital twin technology to the automatic driving of the monorail hoist 2, which realizes the unmanned transportation of the monorail hoist 2, reduces the input of personnel in the mine, and avoids safety accidents caused by irregular management or improper operation of the driver.

The positioning device can be arranged on the operator through reproducing the three-dimensional model for the underground roadway in this embodiment. When emergency accidents of the mine collapse and the trapped personnel occur due to special reasons, the three-dimensional digital twin constructed by the digital twin can quickly search and rescue the personnel to ensure the personnel safety.

The mining lamp 3 in this embodiment is not only used for illumination, but also used as an intermediary for data transmission between the surface and the underground (the surface refers to above the mine (ground), the underground refers to below the mine (underground)) through the first LIFI device in the mining lamp 3.

It will be understood by those skilled in the art that, unless defined otherwise, all terms, including technical terms and scientific terms, used herein have the same meaning as commonly understood by those of ordinary skill in the art. It should also be understood that terms such as those defined in the general dictionary should be understood to have meanings consistent with their meanings in the context of the prior art, and unless defined as herein, are not to be construed in an idealized or overly formal sense.

Throughout this specification, the term "LIFT" is short for "light fidelity", the light fidelity is a wireless communication technology which utilizes light to transmit data and position between devices.

Throughout this specification, the term "digital twin" is a detailed and dynamically updated virtual replica of physical objects or processes, made to monitor performance, test different scenarios, predict issues, and find optimization opportunities. Unlike the traditional computer-aided design and engineering (Computer Aided Design CAD/Computer Aided Engineering CAE) models, a "digital twin" always has a unique, real-world counterpart, receives live data from the counterpart, and changes accordingly to mimic the origin (i.e., the counterpart) through its lifecycle. However, the twining (i.e., the twining between the digital twin and the corresponding counterpart) doesn't happen out of thin air. The process of the twining involves numerous pieces (e.g., units and/or circuits) working as a uniform system which is defined as the "digital twin system". Digital twin technology includes static and dynamic modes. In the static digital twin mode, a static digital twin model is used and mainly applied to scenarios such as record restoration, while in the dynamic digital twin mode, a dynamic digital twin model is used and mainly applied to scenarios such as decision-making assistance.

Throughout this specification, the term "fitting algorithm" is the process of connecting a series of points on a plane with a smooth curve.

The meaning of "and/or" described in this present disclosure includes the situations that each of them is existed separately or both of them are existed at the same time.

The meaning of "connection" described in this present disclosure may be referred to a direct connection between components or an indirect connection between components through other components.

According to the ideal embodiments of the present disclosure as inspirations, and through the above descriptions, the relevant personnel would make various changes and modifications without departing from the technical ideas of the present disclosure. The technical scope of the present disclosure is not limited to the contents in the specification, and the technical scope must be determined according to the scope of the claims.

What is claimed is:

1. An automatic driving system of a monorail hoist driven based on a digital twin, wherein the automatic driving system comprises a data transferring system, a high-speed communication link, an automatic driving module, a railroad switch sensor module and a positioning system module located on an underground, and an intelligent control system and a digital twin system located on a surface, wherein the data transferring system includes a plurality of mining lamps, the plurality of mining lamps are arranged on an inner wall of a roadway at intervals, and the data transferring system is configured to transmit data on the surface and the underground;

the high-speed communication link is configured to transmit data between the railroad switch sensor module and the data transferring system, between the positioning system module and the data transferring system, and between the data transferring system and the intelligent control system;

the automatic driving module is connected to the data transferring system, and the automatic driving module is arranged on each monorail hoist, and the automatic driving module is configured to control the monorail hoist to realize an unmanned driving, the automatic driving module includes a state detecting module and a control module of the monorail hoist, wherein the state detecting module is configured to determine two working states of the monorail hoist, one is a busy state and another is an idle state; a stress sensor is arranged on a hoisting chain of the monorail hoist, when a stress value measured by the stress sensor on the hoisting chain exceeds a preset range, the automatic driving module determines that the monorail hoist is in the busy state; when the stress value measured by the stress sensor on the hoisting chain does not exceed the preset range, the automatic driving module determines that the monorail hoist is in the idle state;

the monorail hoist nearest to a transporting point and in the idle state is searched by the intelligent control system through an artificial intelligence algorithm;

the railroad switch sensor module includes a plurality of railroad switch sensors, the plurality of railroad switch sensors are arranged at each movable track of each railroad switch one by one, and the railroad switch sensors are configured to sense a connection-position state of each movable track of each railroad switch;

the positioning system module is configured to pick up a profile of an inner surface in the roadway, to position a track device, to position a geographic position of each underground monorail hoist in real time, and to transmit a picked-up position information of the profile of the inner surface in the roadway, a positioning position information of the track device and a geographic position information of each underground monorail hoist to the data transferring system;

a bidirectional transmission is performed between the intelligent control system and the data transferring system, the bidirectional transmission is performed between the data transferring system and the railroad switch sensor module, the bidirectional transmission is performed between the data transferring system and the positioning system module;

a bidirectional transmission is performed between the digital twin system and the intelligent control system, the positioning system module includes a positioning tag and a positioning base station, wherein the positioning tag is arranged on the inner surface in the roadway to pick up the profile of the inner surface in the roadway, and is configured to transmit the picked-up position information of the profile of the inner surface in the roadway to a nearest positioning base station, and discretized spotted profile of the inner surface in the roadway is fitted to a continuous curved surface profile of the inner surface in the roadway by a fitting algorithm, a three-dimensional model of the roadway is obtained; the positioning tag is further arranged on the track device to position the track device, and is configured to transmit the positioning position information of the track device to the nearest positioning base station, the positioning tag is further arranged on the monorail hoist to position the geographic position of each underground monorail hoist in real time, and is configured to transmit the geographic position information of each underground monorail hoist to the nearest positioning base station; the positioning base station is arranged in the roadway at intervals, the positioning base station is connected to the positioning tag through a wireless network, and the positioning base station is configured to receive the picked-up position information, the positioning position information and the geographic position information from the positioning tag;

the intelligent control system includes a data transceiving unit, a data processing unit, and a control unit;

each of the mining lamps includes a first wireless signal receiving device, a first wireless signal transmitting device, a first LIFI wireless signal receiving device, and a first LIFI wireless signal transmitting device, the data transceiving unit is respectively connected to the first wireless signal receiving device and the first wireless signal transmitting device, the first wireless signal receiving device is wiredly connected to the first LIFI wireless signal transmitting device, and the first wireless signal transmitting device is wiredly connected to the first LIFI wireless signal receiving device;

the automatic driving module includes a second LIFI wireless signal receiving device, and the second LIFI wireless signal receiving device is connected to the first LIFI wireless signal transmitting device through a LIFI wireless communication link;

the positioning base station includes a second LIFI wireless signal transmitting device, and the second LIFI wireless signal transmitting device is connected to the first LIFI wireless signal receiving device through the LIFI wireless communication link;

the railroad switch sensor module includes a third LIFI wireless signal receiving device and a third LIFI wireless signal transmitting device, the third LIFI wireless signal receiving device is connected to an output terminal of the first LIFI wireless signal transmitting device through the LIFI wireless communication link, and the third LIFI wireless signal transmitting device is connected to the first LIFI wireless signal receiving device through the LIFI wireless communication link; and the positioning system module transmits the position information on the plurality of positioning tags to the nearest positioning base station, the positioning base station transmits the position information to the data transferring system by the second LIFI wireless signal transmitting device through the LIFI wireless communication link, so as to determine the profile of the inner surface in the roadway, and the underground position information on the monorail hoist and the track device; the railroad switch sensor module transmits the railroad switch information to the data transferring system by the third LIFT wireless signal transmitting device through the LIFI wireless communication link, and the information is transmitted by the first LIFI wireless signal transmitting device to the digital transceiving unit, and then the information is transmitted to a dynamic digital twin model in the digital twin system after optimally processing by the data processing unit; the digital twin system updates the dynamic digital twin model in real-time according to the information collected by each railroad switch sensor in the railroad sensor module and the position information including monorail hoist, roadway and track device collected by the positioning tags, and converts a real three-dimensional information on the underground mine road and the monorail hoist operation condition into digital three-dimensional information in a virtual world, thereby completing the data transmission process.

2. The automatic driving system of the monorail hoist driven based on the digital twin according to claim 1, wherein the data transceiving unit performs the bidirectional transmission with the railroad switch sensor module through the data transferring system, and performs the bidirectional transmission with the positioning system module through the data transferring system;

the data processing unit receives information transmitted by the data transceiving unit, and the data processing unit transmits the information to the digital twin system after optimizing the information; and the digital twin system transmits the information to the control unit, and the control unit sends an instruction to the data transceiving unit.

3. The automatic driving system of the monorail hoist driven based on the digital twin according to claim 2, wherein the high-speed communication link is further configured to transmit the data between the data transceiving unit and the data transferring system, between the transceiving unit and the data processing unit, between the data processing unit and the digital twin system, between the digital twin system and the control unit, and between the control unit and the data transceiving unit.

4. The automatic driving system of the monorail hoist driven based on the digital twin according to claim 3, wherein
the positioning base station is configured to transmit the position information to the data transceiving unit on the surface.

5. The automatic driving system of the monorail hoist driven based on the digital twin according to claim 4, wherein the track device includes the roadway, a monorail hoist track, a chain, and an anchor bolt.

6. The automatic driving system of the monorail hoist driven based on the digital twin according to claim 1, wherein
a data transmission path from the surface to the underground is that the data transceiving unit transmits the data to the first wireless signal receiving device, the first wireless signal receiving device transmits the data to the first LIFI wireless signal transmitting device, and then the first LIFI wireless transmitting device transmits the data to the second LIFI wireless signal receiving device and the third LIFI wireless signal receiving device respectively; and a data transmission path from the underground to the surface is that the second LIFI wireless signal transmitting device and the third LIFT wireless signal transmitting device respectively transmit the data to the first LIFI wireless signal receiving device, the first LIFI wireless signal receiving device transmits the data to the first wireless signal transmitting device, and the first wireless signal transmitting device transmits the data to the data transceiving unit.

7. An automatic driving method of a monorail hoist driven based on a digital twin, wherein the automatic driving method comprises following steps:

Step S1, establishing a static digital twin model of a roadway;

S1-1, transmitting, by a railroad switch sensor module and a positioning system module, a connection-position state of each movable track of each railroad switch, a cross sectional size of the roadway and a trend of the roadway to an intelligent control system through a data transferring system;

S1-2, transmitting, by the intelligent control system, received information to a digital twin system; and S1-3, establishing, by the digital twin system, the static digital twin model of the roadway according to the received information; the positioning tag is arranged on the inner surface in the roadway to pick up a profile of the inner surface in the roadway, a fitting algorithm is applied to fit the discretized spotted profiles of the inner surface in the roadway to a continuous curved surface profile, that is, to obtain three-dimensional model of the roadway;

Step S2, establishing a static digital twin model of a monorail hoist;

S2-1, transmitting, by a positioning system module, geographic position information of each monorail hoist to the intelligent control system through the data transferring system;

S1-2, transmitting, by the intelligent control system, the information to the digital twin system; and S1-3, establishing, by the digital twin system, a static digital twin model for each monorail hoist independently according to the received information;

Step S3, obtaining a complete static digital twin model;

S3-1, importing the static digital twin model of the monorail hoist established in Step S2 into the static digital twin model of the roadway established in Step S1, thereby integrating into the complete static digital twin model;

Step S4, importing the data;

S4-1, numbering each monorail hoist in sequence in a form of serial numbers; and S4-2, importing the number information in Step S4-1 into an automatic driving module in the monorail hoist and the static digital twin model corresponding to each monorail hoist;

Step S5, obtaining a dynamic digital twin model;

S5-1, capturing, by the positioning system module, a dynamic position of an entire body of each monorail hoist in real time, and transmitting the dynamic position of the entire body of each monorail hoist to the intelligent control system;

S5-2, transmitting, by the intelligent control system, the obtained dynamic position information on the entire body of each monorail hoist in real time to the complete static digital twin model obtained in Step S3, thereby updating a position of the digital twin of each monorail hoist in the static digital twin model of the roadway in real time; and S5-3, completing a process from static digital twins to dynamic digital twins at this point, and obtaining the dynamic position information on the entire body of the monorail hoist corresponding to each number in the roadway, thereby obtaining the dynamic digital twin model of each monorail hoist in the roadway;

wherein the positioning system module transmits the position information of a plurality of positioning tags to a nearest positioning base station, the positioning base station transmits the position information to the data transferring system by a second LIFI wireless signal transmitting device through a LIFI wireless communication link, so as to determine the profile of the inner surface in the roadway, and the underground position information on the monorail hoist and the track device; the railroad switch sensor module transmits a railroad switch information to the data transferring system by a third LIFI wireless signal transmitting device through the LIFI wireless communication link, and the information is transmitted by a first LIFI wireless signal transmitting device to the digital transceiving unit, and then the information is transmitted to the dynamic digital twin model in the digital twin system after optimally processed by the data processing unit; the digital twin system updates the dynamic digital twin model in real-time according to the information collected by each railroad switch sensor in a railroad sensor module and the position information including monorail hoist, roadway and track device collected by the positioning tags;

Step S6, performing an unmanned deploying control on the monorail hoists;

S6-1, connecting the digital twin system to a control unit of the intelligent control system;

S6-2, reading, by the control unit, the data for the dynamic digital twin in Step S5 in real time, and analyzing the read data;

S6-3, making, according to the analysis in Step S6-2, a corresponding instruction by the control unit and transmitting the corresponding instruction to the data transceiving unit, and transmitting, by the data transceiving unit, the instruction to the automatic driving module through the data transferring system; and S6-4, performing, by the automatic driving module, the unmanned deploying control on the corresponding monorail hoist; immediately determining, when the monorail hoist is required to transport, the positions of a transporting point a target point to be transported by the intelligent control system; building in, after determining the positions of the transporting point and the target point, the intelligent control system through the artificial intelligence algorithm; searching for, by the intelligent control system, the monorail hoist nearest to the transporting point and in an idle state in the established dynamic digital twin model through applying the artificial intelligence algorithm.

8. The automatic driving method of the monorail hoist driven based on the digital twin according to claim 7, wherein the method further includes Step 7 implemented before Step 3, and Step 7 is specifically as follows:

Step 7, establishing a static digital twin model of the track device;

S7-1, positioning, by a plurality of positioning tags in the positioning system module, geographical positions of the roadway, a monorail hoist track, a chain and an anchor bolt;

S7-2, transmitting, through the data transferring system, the geographic position information on the track device obtained in Step S7-1 to the intelligent control system;

S7-3, transmitting, by the intelligent control system, the received information to the digital twin system; and S7-4, establishing, according to the received information, the static digital twin model of the track device by the digital twin system.

* * * * *